(12) United States Patent
Cummings

(10) Patent No.: US 7,490,467 B2
(45) Date of Patent: Feb. 17, 2009

(54) GAS FLOW ENHANCER FOR COMBUSTION ENGINES

(76) Inventor: Craig D. Cummings, 3800 W. S.R. 248, P.O. Box 681273, Park City, UT (US) 84068

( * ) Notice: Subject to any disclaimer, the term of this patent is extended or adjusted under 35 U.S.C. 154(b) by 258 days.

(21) Appl. No.: 11/035,487

(22) Filed: Jan. 15, 2005

(65) Prior Publication Data

US 2006/0075745 A1   Apr. 13, 2006

Related U.S. Application Data

(60) Provisional application No. 60/580,146, filed on Jun. 15, 2004.

(51) Int. Cl.
*F01N 7/00* (2006.01)
(52) U.S. Cl. .............. 60/324; 60/274; 60/312
(58) Field of Classification Search ............ 60/274, 60/312, 324; 181/268, 272, 280
See application file for complete search history.

(56) References Cited

U.S. PATENT DOCUMENTS

| | | | |
|---|---|---|---|
| 1,049,433 A | | 1/1913 | Winslow |
| 1,612,584 A | * | 12/1926 | Hunter et al. ............... 181/279 |
| 2,051,675 A | | 8/1936 | Blanchard |
| 2,239,549 A | | 4/1941 | Chipley |
| 2,740,616 A | | 4/1956 | Walden |
| 3,235,003 A | * | 2/1966 | Smith .......................... 165/135 |
| 3,757,892 A | | 9/1973 | Raudman, Jr. |
| 4,050,539 A | * | 9/1977 | Kashiwara et al. .......... 181/280 |
| 4,109,753 A | | 8/1978 | Lyman |
| 4,234,054 A | | 11/1980 | Chapin |
| 4,317,502 A | | 3/1982 | Harris et al. |
| 4,485,890 A | * | 12/1984 | Harris et al. ................. 181/280 |
| 4,605,092 A | * | 8/1986 | Harris et al. ................. 181/280 |
| 5,058,704 A | * | 10/1991 | Yu ............................. 181/262 |
| 5,152,366 A | | 10/1992 | Reitz |
| 5,214,254 A | | 5/1993 | Sheehan |
| 5,496,975 A | | 3/1996 | Wagner |
| 5,603,893 A | | 2/1997 | Gundersen et al. |
| 5,663,537 A | | 9/1997 | Ko et al. |
| 5,902,970 A | | 5/1999 | Ferri |
| 5,962,822 A | | 10/1999 | May |
| 6,213,251 B1 | | 4/2001 | Kesselring |
| 6,343,673 B1 | | 2/2002 | Chang |
| 6,679,351 B2 | | 1/2004 | Cummings et al. |
| 7,341,049 B2 | | 3/2008 | Clack |

* cited by examiner

*Primary Examiner*—Thomas E Denion
*Assistant Examiner*—Diem Tran

(57) ABSTRACT

A gas flow enhancer for a combustion engine includes a housing, configured to receive an inlet flow of gas at an inlet pressure, and enclosing an expansion chamber. Disposed within the expansion chamber are a set of inner vanes and outer vanes, and a flow separator. The outer vanes are disposed outside the flow separator and produce an outer helical flow of the gas. The inner vanes are disposed within the flow separator and produce an inner helical flow of the gas, the inner helical flow having a higher velocity and lower pressure than the outer helical flow. The outer helical flow and inner helical flow are recombined at an outlet of the expansion chamber so as to produce an outlet laminar flow profile having a lower average pressure than the inlet pressure.

22 Claims, 5 Drawing Sheets

GAS FLOW ENHANCER FOR COMBUSTION ENGINES

PRIORITY CLAIM

The present application claims priority from U.S. provisional patent application Ser. No. 60/580,146, filed Jun. 15, 2004, and entitled PIETO TURBORAMJET ENGINE COOLER AND MUFFLER.

BACKGROUND OF THE INVENTION

1. Field of the Invention

The present invention relates generally to gas flow in combustion engines. More particularly, the present invention relates to a device for improving the efficiency of gas flow in an intake or exhaust conduit, so as to increase engine power and efficiency.

2. Related Art

The principles of operation of combustion engines are well understood. Air and fuel are mixed and drawn into a combustion chamber through inlet valves, where they are ignited. The ignition imparts kinetic energy to mechanical engine components, allowing the engine to do work, and also produces hot waste gasses which are discharged through exhaust valves, and eventually exhausted to the atmosphere.

In order for the engine to do work, the exhaust pressure must be lower than the combustion pressure. At the same time, it is desirable to dampen the noise from the combustion, and to treat the waste gasses to reduce pollution. Thus, internal combustion engines are typically provided with catalytic converters and particulate traps to reduce emissions of undesirable gasses and particles from inefficient combustion, and mufflers of various kinds to reduce engine noise.

Unfortunately, these components disposed in the exhaust stream tend to increase exhaust back pressure, thus reducing the power output and efficiency of the engine. This also tends to result in a higher operating temperature for the engine, reducing the life of lubricants and of the engine itself.

SUMMARY OF THE INVENTION

It has been recognized that it would be advantageous to develop an exhaust system that can reduce engine noise without substantially increasing back pressure on the engine.

The invention advantageously provides a gas flow enhancer for a combustion engine, having a housing, configured to receive an inlet flow of gas from a gas flow conduit, and enclosing an expansion chamber. Disposed within the expansion chamber are a set of inner vanes and outer vanes. The outer vanes are configured to produce an outer helical flow of the gas around an outer periphery of the expansion chamber, and the inner vanes are configured to produce an inner helical flow of the gas within a central portion of the expansion chamber, the inner helical flow having a higher velocity and lower pressure than the outer helical flow. The outer helical flow and inner flow are recombined at an outlet so as to produce an outlet laminar flow profile having a lower average pressure than the inlet pressure.

In accordance with another aspect thereof, the invention provides an exhaust system for a combustion engine, including an exhaust pipe, connected to the engine, and a first gas flow enhancer, disposed in the exhaust pipe. The first gas flow enhancer includes a housing, configured to receive an inlet flow of exhaust gas from the exhaust pipe at an inlet pressure, a plurality of outer vanes, disposed within the housing around an outer periphery thereof, configured to produce an outer helical flow of the exhaust gas around the outer periphery, a plurality of inner vanes, disposed within the housing in a central portion thereof, inwardly of the outer vanes, configured to produce an inner helical flow of the exhaust gas within the central portion, the inner helical flow having a higher velocity and lower pressure than the outer helical flow, and an outlet, configured to combine the outer helical flow and the inner helical flow, so as to produce a laminar flow profile having a lower average pressure than the inlet pressure.

In accordance with a more detailed aspect thereof, the exhaust system can include a second gas flow enhancer, disposed in the exhaust pipe.

Additional features and advantages of the invention will be apparent from the detailed description which follows, taken in conjunction with the accompanying drawings, which together illustrate, by way of example, features of the invention.

DETAILED DESCRIPTION

Figure 1A:
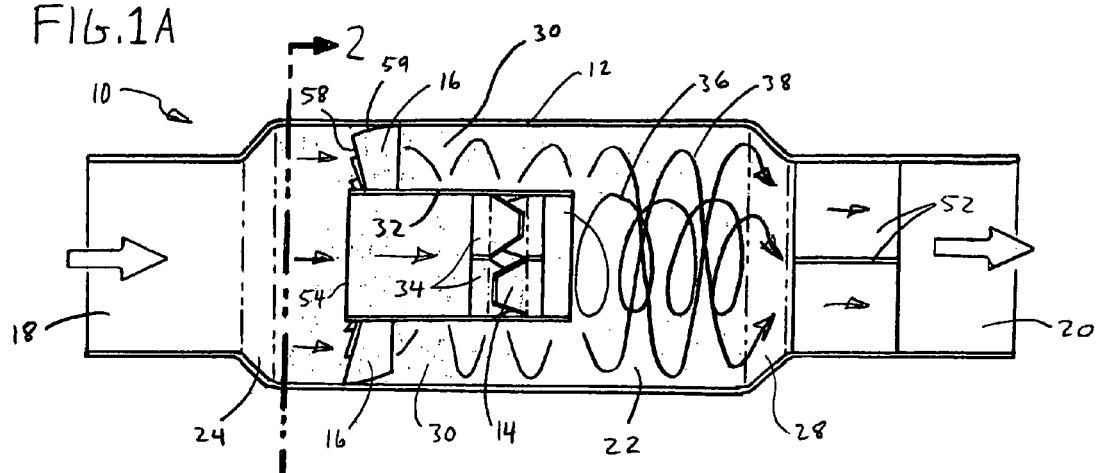
FIG. 1A is a side, cross-sectional view of one embodiment of a gas flow enhancer, showing the gas flow paths therethrough.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

The present invention provides a device for enhancing the flow of gasses in a conduit associated with a combustion engine. As used herein, the term "gas" is intended to have its basic scientific meaning—i.e. a fluid that is not a liquid. The device of the present invention is applicable to both exhaust gasses and inlet gasses for an engine, and reduces overall flow pressure, and increases velocity, for greater efficiency. The device includes elements that split the gas stream into two streams, and induce a vortex spin in each stream within a chamber, creating a pressure differential within a laminar flow outlet, decreasing backpressure and encouraging flow.

Figure 1B:
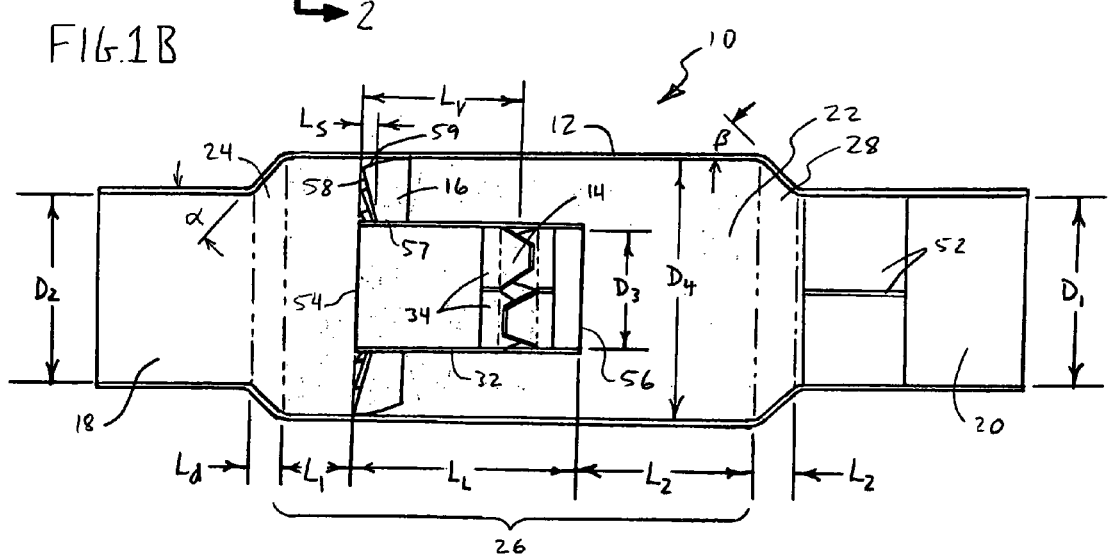
FIG. 1B is a side, cross-sectional view of the gas flow enhancer of FIG. 1.

One embodiment of a gas flow enhancer 10 in accordance with the present invention is shown in FIGS. 1A and 1B. The gas flow enhancer generally comprises a hollow cylindrical housing 12, with two sets of spiral vanes 14, 16. The housing includes an inlet 18, an outlet 20, and an expansion chamber 22 between the inlet and outlet. The expansion chamber comprises a generally conical diverging section 24, a central cylindrical section 26, and a generally conical converging section 28 interconnecting the central cylindrical section with the outlet. The central cylindrical section has a greater diameter than either the inlet or outlet, with the diverging and converging sections providing a transition between the respective diameters. The diverging and converging sections are designed to provide a gradual transition of flow between the inlet and outlet and the expansion chamber. While the inlet and outlet are shown as having the same diameter, this need not be the case, as discussed below. Additionally, while the inlet and outlet are shown as being circular in cross-section, this need not be the case, either. Other conduit shapes can be associated with the flow enhancer of the present invention.

The sets of spiral vanes 14, 16, are disposed within the central cylindrical section 26 of the expansion chamber 22. The outer vanes 16 are disposed in an annular space 30 between the wall of the central cylindrical section of the expansion chamber and the outside of an inner cylinder 32, also called a flow separator or flow splitter pipe. The inner vanes 14 are disposed within the inner cylinder. The inner cylinder separates or splits the gas flow into a central flow portion, denoted by arrow 36, and an outer or annular flow portion, denoted by arrows 38. The central flow portion contacts the inner vanes, and the outer flow portion flows past the outer vanes.

Because of their geometry, the outer vanes 16 produce a spiral or helical flow of gas, essentially a vortex, of the outer flow around the outer periphery of the central expansion chamber 22 of the housing. This outer flow is represented by arrow 38 in FIG. 1. The inner vanes 14 produce a spiral or helical vortex within the center of the hollow housing, represented by arrow 36.

The configuration of the inner and outer vanes can be varied in many ways. For example, number of outer vanes can vary. The inventors have used twelve outer vanes, but the device can be configured with a greater or lesser number. Likewise, the angle of the outer vanes can vary. One angle that the inventor has successfully used is an angle of about 55 degrees relative to the incoming gas flow, though the relative angle of the outer vanes can vary from this angle. For example, it is believed that angles from about 15 degrees to about 55 degrees can be suitable for a wide range of flow characteristics. The maximum practical angle is desirable in order to maximize the spiral characteristics of the helical flow. However, the creation of turbulence downstream will disturb the flow and drain energy (i.e. velocity), thus reducing the effectiveness of the device. Angles above 55 degrees can be used, but are impractical for many flow conditions. On the other hand, vane angles below about 15 degrees tend to produce a less dramatic spiral flow, providing reduced performance of the gas flow enhancer. Indeed, if the vane angles are too small the helical flow pattern may not be established at all.

Figure 2A:
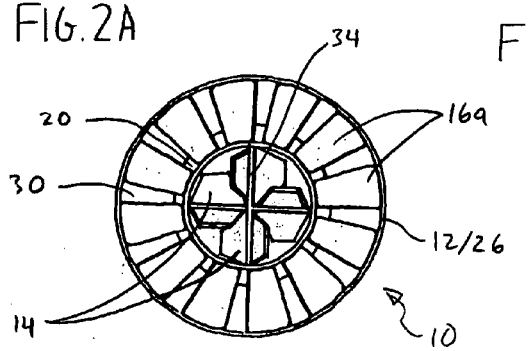
FIG. 2A is a transverse cross-sectional view of the gas flow enhancer of FIG. 1 showing a first alternative configuration for the outer vanes.
Figure 2B:
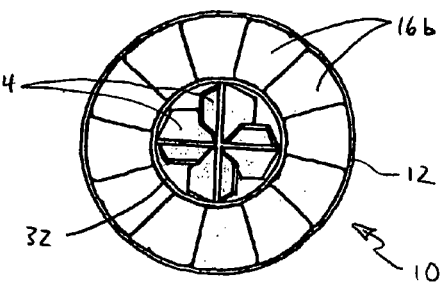
FIG. 2B is a transverse cross-sectional view of the gas flow enhancer of FIG. 1 showing a second alternative configuration for the outer vanes.

The configuration of the outer vanes can be adjusted in other ways, too. For example, viewing FIG. 2A, the outer vanes can have a size and angle such that there is a visible gap between adjacent vanes, allowing a direct line of sight through the outer vanes and to the outlet 20 if one peers through the gas flow enhancer device. Alternatively, as shown in FIG. 2B, an alternative configuration of outer vanes 16b can include vanes having a size and/or angle that blocks any direct line-of-sight through the outer vanes and to the outlet. The inventor has found that this latter configuration provides greater muffling of engine noise by blocking more of the direct path for sound.

Figure 10:
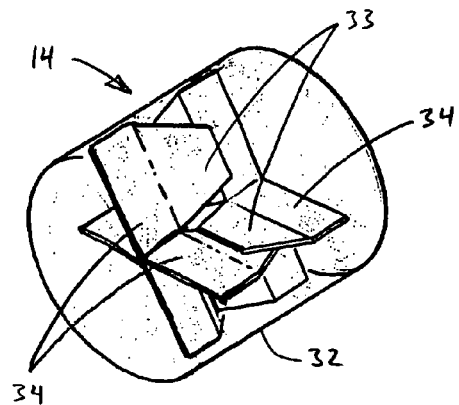
FIG. 10 is a perspective view of a set of inner vanes that are suitable for a gas flow enhancer in accordance with the present invention.

The inner vanes 14 can also be configured in various ways. A detail view of one embodiment of the inner vanes is shown in FIG. 10. In this embodiment, the inner vanes comprise four flaps 33 bent downwardly from each of an identical pair of cross braces 34. The rearward of the pair is reversed and placed adjacent the forward one, with a gap between them. The assembly of the two blade sets is attached within the separator pipe 32, and provides a symmetrical group of eight vanes that together create the tight rotational spin of gases passing through the separator pipe. While this configuration produces eight vanes, it will be apparent that a greater or lesser number of inner vanes can be provided, and these can have different configurations than that shown.

Because of their closer spacing, the inner vanes 14 produce a tighter central spiral flow with a higher rotational velocity and lower pressure than the outer spiral flow. In the embodiment depicted in the figures, the inner vanes are disposed at an angle of about 55 degrees relative to the incoming gas flow, the angle being selected for generally the same reasons given above with respect to the outer vanes. However, the relative angle of the inner vanes can vary within a range of from about 30 degrees to about 55 degrees. The inventor has found that angles of less than about 30 degrees do not adequately produce the desired central spiral flow.

There are other notable aspects of the inner and outer vanes. First, while the vanes (both inner and outer) are shown as being generally planar, curved vanes can also be used, with the trailing edges of the vanes having the angles within the ranges mentioned. Additionally, the position of the vanes relative to the inlet and outlet can also be varied. For example, in the configuration of FIG. 1, the outer vanes 16 are disposed adjacent to the leading edge 54 of the inner cylinder 32, while the inner vanes 14 are disposed toward the rear of the inner cylinder, at a diatance Lv from the leading edge of the inner cylinder. The outer vanes are configured with a tapered leading edge 58, and a straight trailing edge. The leading edge is positioned such that the leading edge at the base 57 of each outer vane is set back a distance Ls from the leading edge of the inner cylinder, while the leading edge at the outer end 59 of each outer vane meets the outer cylinder 12 at a positioned substantially aligned with the leading edge of the inner cylinder. The inventor has found that this is an advantageous configuration for the outer vanes.

Nevertheless, other relative positions for the inner and outer vanes can also be used. For example, in the dual-stage gas flow enhancer embodiment shown in FIG. 7, (described in more detail below) the outer vanes 116 are disposed and configured with respect to their supporting inner cylinder like those shown in FIG. 1, while the inner vanes 114 are disposed entirely at the rear of the respective inner cylinder. As another alternative, shown in FIG. 3, the inner vanes 14a can be disposed near the leading edge of the inner cylinder 32, while the outer vanes 16c are disposed toward the rear of the inner cylinder. Other variations in position of the inner and outer vanes are also possible.

As shown in FIG. 1, both sets of vanes 14, 16, are configured to produce a spiral or helical flow that rotates in a common direction. However, because of differential pressure and velocity characteristics, the lower pressure inner flow 36 remains generally separate from the higher pressure outer flow 38 until reaching the converging section 28. The expansion chamber contains the rotational gases to reinforce velocity of the gas and affect a vacuum on the upstream side, and propulsion of flow downstream. Within the converging section of the expansion chamber 22 the inner flow and outer flow converge and recombine, then exit through the outlet 20 in a laminar flow condition.

Figure 4A:
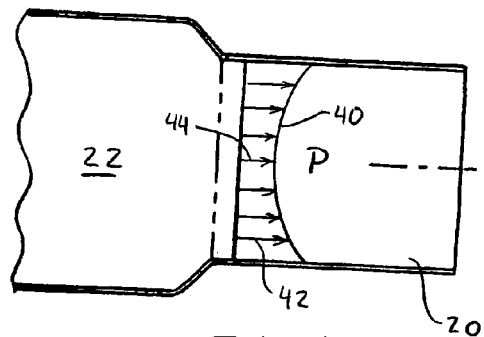
FIG. 4A is a side, cross-sectional view of the converging section and outlet nozzle of a gas flow enhancer, showing an approximate pressure profile for the exhaust gasses.
Figure 4B:
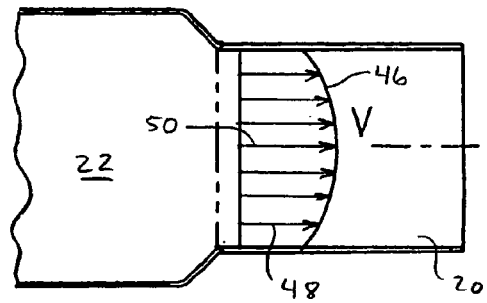
FIG. 4B is a side, cross-sectional view of the converging section and outlet nozzle of a gas flow enhancer, showing an approximate velocity profile for the exhaust gasses.

As the two flows converge, the pressure and velocity characteristics of the inner flow 36 and outer flow 38 persist, producing a laminar outflow with a spatially varying flow profile. That is, as shown by the pressure profile curve 40 of FIG. 4A, the flow that is toward the side walls of the outlet conduit, denoted by arrow 42, has higher pressure than the flow in the center of the outlet, denoted by arrow 44. Conversely, as shown by the velocity profile curve 46 of FIG. 4B, the flow that is toward the side walls of the outlet conduit, denoted by arrow 48, has lower velocity than the flow in the center of the outlet, denoted by arrow 50.

Figure 3:
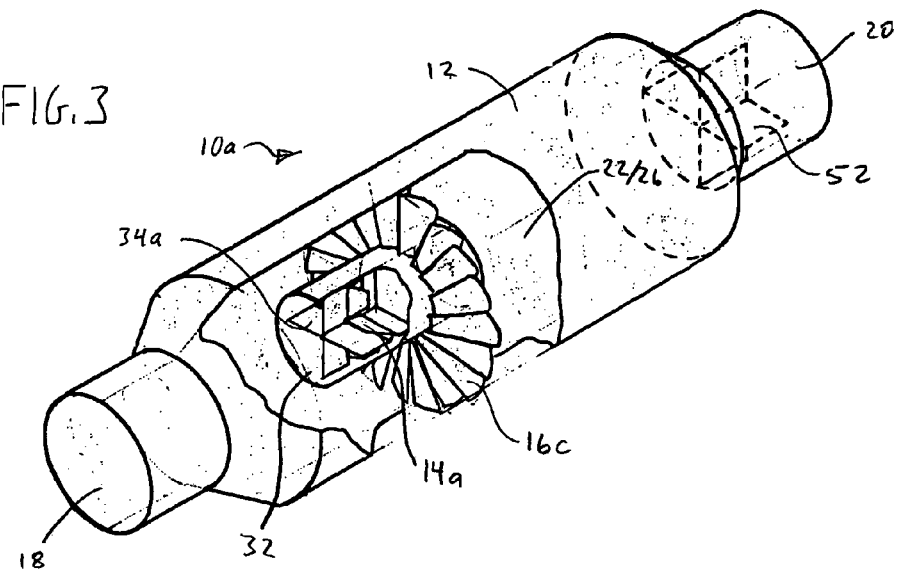
FIG. 3 is a partial cut-away perspective view of an alternative embodiment of a gas flow enhancer similar to that of FIG. 1.

Additionally, the overall pressure of the flowing gas at the outlet 20 is lower than at the inlet 18, such that the average outflow velocity is higher, demonstrating the gas drawing effect the gas flow enhancer device 10 provides. As shown in FIGS. 1 and 3, the outlet can also include flow-straightening vanes 52, which help to redirect the flow and reduce persistence of the helical or spiral flow pattern. While a suitable flow-straightening device can take many different configurations, that shown in the figures comprises flat metal strips or plates disposed at 90 degree angles to each other, and attached inside the respective tube, similar to the cross braces 34 that are part of the inner vanes 14 inside the inner cylinder.

Various geometric aspects of the flow enhancer 10 contribute to its operation. Viewing FIG. 1B, the diameter $D_4$ of the central cylindrical section 26 of the housing 12 is greater than the size of the inlet or outlet tubes. This allows the spiral vanes and other structure within the expansion chamber to have their effect on the flowing gasses without increasing net back-pressure. In one operative example, the inlet and outlet pipes 18, 20, have diameters $D_1$, $D_2$ of 2.5 inches, and the central section of the expansion chamber 22 has a diameter $D_4$ of 3.5 inches. In another operative example, the inlet and outlet pipes have a diameter of 4 inches, and the central expansion chamber has a diameter of 6 inches. These different diameter combinations relate to the size and operating ranges of an engine, and the different flow regimes that will be produced, as described in more detail below.

As noted above, the inlet and outlet pipes need not be the same size. For example, the inventor has produced an operative system wherein the inlet pipe has a diameter of 4 inches, the central expansion chamber has a diameter of 6 inches, and the outlet has a diameter of 5 inches. The inventor has found that this configuration improves the operation of the flow enhancer. Other size combinations are also possible. Additionally, while it is desirable for the central expansion chamber to be cylindrical, so as to contribute to the spiral flow, the inlet and outlet pipes can be some shape other than circular, such as rectangular, octagonal, etc.

The inner cylinder 32 has a length $L_L$, and a diameter $D_3$ that is smaller than the diameters of the inlet and outlet pipes 18, 20. The diameter and length of the inner cylinder are proportional to the overall size of the gas flow enhancer. The inventor has determined workable dimensions for these elements based in part on trial and error. In one operative example, where the diameter $D_4$ of the central expansion chamber is 3.5 inches, an inner cylinder with a diameter $D_3$ of 1.6 inches has been found to be suitable.

The length $L_d$ of the diverging section 24 and length $L_c$ of the converging section 26 depend upon the respective sizes of the inlet and outlet conduits and the central section of the expansion chamber 22, and the angles of divergence α and convergence β. These angles are selected based largely upon the same considerations discussed above with respect to the angle of the vanes. The divergence and convergence angles can range from about 20 degrees as a practical minimum, to about 55 degrees as a practical maximum. Other angles can also be used. It will be apparent that smaller angles will have the effect of making the gas flow enhancer device longer, which can be undesirable from a space efficiency standpoint.

The spiral vanes, both the inner vanes 14 and outer vanes 16, are located toward the inlet 18, but not immediately adjacent to the inlet. The distance $L_1$ between the diverging section and the forward edge 54 of the inner cylinder 32 is provided to allow the flow to stabilize after expansion and before splitting. In a 6" diameter flow enhancer, a distance $L_1$ that has been used is 1.15 inches. In a 10" diameter flow enhancer, a distance $L_1$ of 1.75 inches has been used. The region between the rearward edge 56 of the inner cylinder and the converging section has a length $L_2$, and provides an open chamber for the inner and outer vortices (represented by arrows 36, 38) to become fully established.

The distances $L_1$, $L_2$ and $L_C$ are functions of the diameter of the central section 26 of the expansion chamber 22 and are selected to provide sufficient distance for full establishment of the helical or spiral flow, both inner and outer. The inner vanes 14 and outer vanes 16, taken together, are disposed at a location within the expansion chamber that is closer to the inlet than the outlet, the distance from the inlet to the leading edge 54 of the inner cylinder 32 being about one fifth the total distance between the inlet and outlet. In one operative example, where the diameter $D_4$ of the central section of the expansion chamber is 3.5 inches and the length $L_L$ of the inner cylinder is 2.5 inches, the distances $L_1$, $L_2$ and $L_C$ are 0.5 inches, 2.25 inches and 0.5 inches, respectively. The inventor has found that making the outlet end of the expansion chamber longer than what is needed to allow establishment of the helical flow adds little to the performance of the device. For example, the inventor has found that for a device having a 6 inch diameter expansion chamber, the total length of the expansion chamber can be 8 inches to provide adequate operation. Additional length does not appear to improve function significantly.

Another geometric feature of the gas flow enhancer 10 that contributes to its operation is the setback distance $L_S$ between the front or leading edge 54 of the inner cylinder 32, and the leading edge 58 of the outer vanes 16 at the base 57 of those vanes. This distance allows the flow to be divided before any disturbance from subsequent elements (e.g. the vanes). In one operative example, where the diameter $D_4$ of the central section of the expansion chamber is 3.5 inches, the diameter $D_3$ of the inner cylinder 32 is 1.6 inches, and the length $L_L$ of the inner cylinder is 2.5 inches, a setback distance $L_S$ of about 0.25 inches has been used. In other configurations, where the dimensions of the gas flow enhancer are different, the inventor has used setbacks $L_S$ that are equal to about ten times the length $L_L$ of the inner cylinder.

Figure 7:
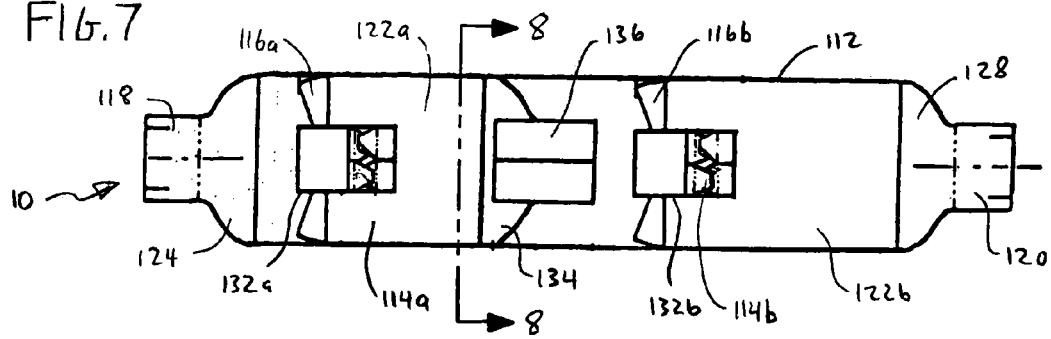
FIG. 7 is a side cross-sectional view of a dual-stage gas flow enhancer in accordance with the present invention.

The inner vanes 14 are also set back a distance $L_V$ from the leading edge 54 of the flow splitter pipe 32. The inventor has determined the desirability of this distance through experimenting with a variety of configurations. It is believed that this distance reduces turbulence in the inner annular flow, and therefore contributes to efficient establishment of the inner helical flow. In the embodiment of FIG. 1, for example, the distance $L_V$ is significantly greater than the setback $L_S$ of the outer vanes, but not so great as to place the vanes at the rear extremity of the inner cylinder. In the embodiment of FIG. 7, a setback $L_V$ which places the inner vanes at the rear extremity of the flow splitter pipe has been used effectively. However, other configurations have also been used. For example, the configuration shown in FIG. 3 places the inner vanes near the leading edge of the inner cylinder, with a small setback (approximately equal to the value of $L_S$ discussed above) and the outer vanes disposed rearwardly a distance.

As noted above, different relative diameters of the expansion chamber and inlet and outlet conduits relate to the size and operating ranges of an engine, and the different flow regimes that will be produced. That is, a smaller diameter gas flow enhancer operates effectively for lower flow rates than a larger one, and therefore is to greatest advantage for a smaller engine and/or an engine operating at a lower speed (e.g. lower RPM). Alternatively, a larger flow enhancer is needed for a larger engine and an engine operating at higher RPMs. The different diameters and range of acceptable diameters for a given engine also allow one to "tune" the exhaust system, and thus reduce noise and the incidence of backfiring.

Figure 12:
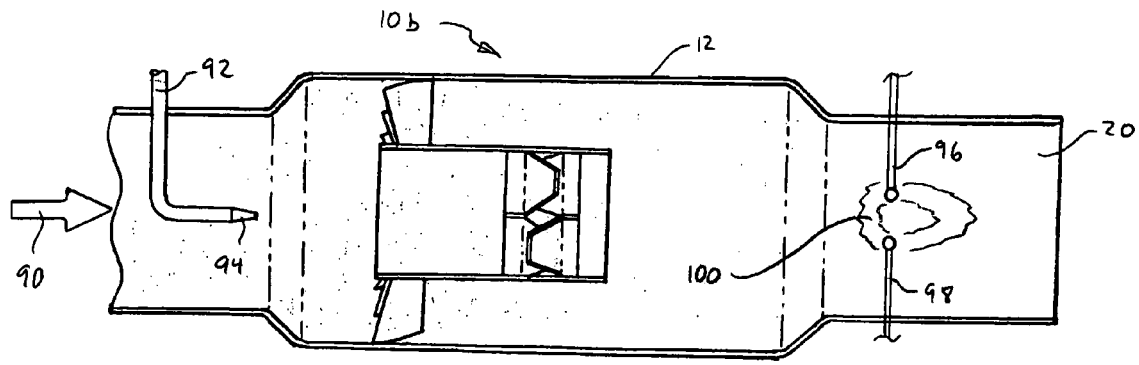
FIG. 12 is a side, cross-sectional view of an alternative gas flow enhancer for an exhaust system, having gas injection and charged electrodes disposed near the outlet.
Figure 13:
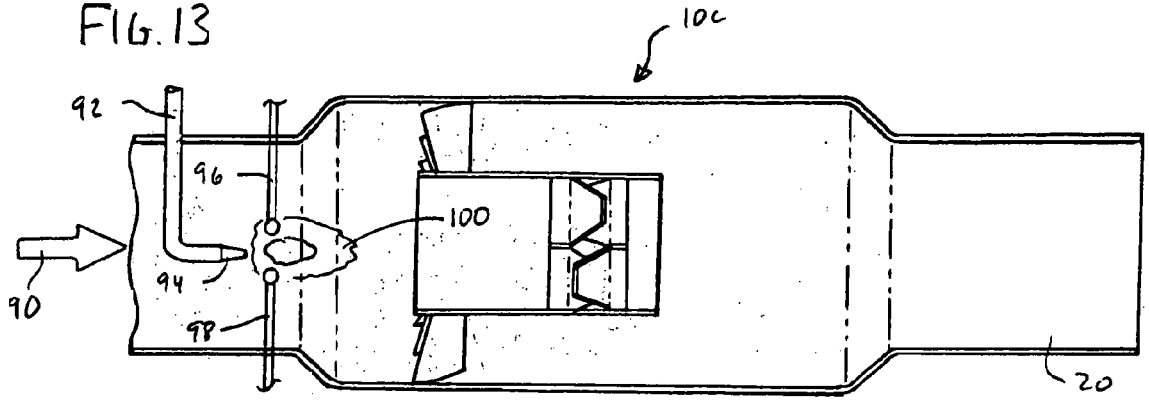
FIG. 13 is a side, cross-sectional view of yet another alternative exhaust gas flow enhancer having gas injection and charged electrodes disposed near the inlet.
Figure 14:
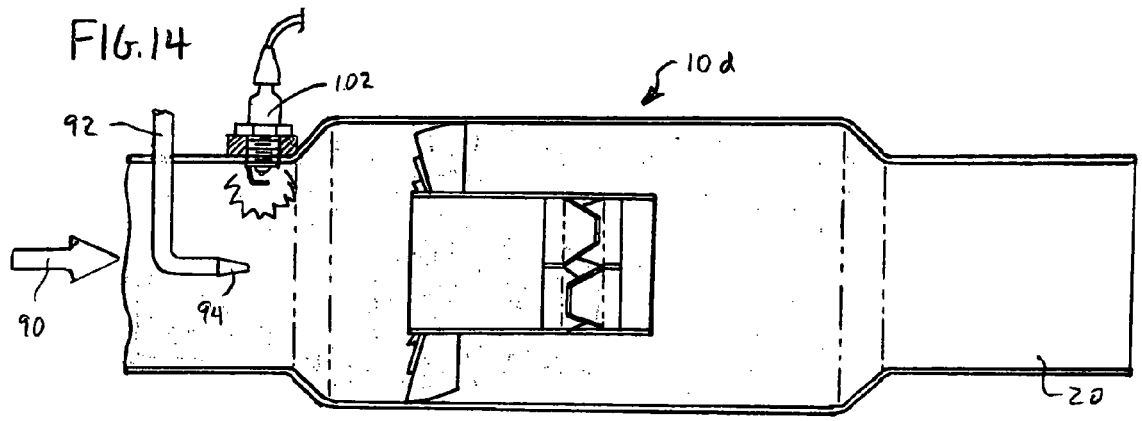
FIG. 14 is a side, cross-sectional view of yet another alternative exhaust gas flow enhancer having gas injection and a spark plug disposed near the inlet.

Additional embodiments of the gas flow enhancer for use in an exhaust stream are shown in FIGS. 12-14. These embodiments provide systems wherein hydrogen gas or other reactant gas can be injected into the exhaust stream and ignited and/or ionized to produce what can be called an exhaust gas transforming plasma (EGTP) muffler. These embodiments operate on some of the same principles outlined in U.S. Pat. No. 5,603,893 to Gunderson, et al. In the views of FIGS. 12-14, the gas flow enhancer units 10 are shown in the same general orientation as in FIG. 1, with exhaust gas flow (indicated by arrows 90) moving from left to right. In these views, the flow-straightening vanes (52 in FIG. 1) are not shown, but it is to be understood that the structures described above for creating the desired flow are presumed to be included.

In the embodiment of FIG. 12, the gas flow enhancer 10b includes an injection tube 92 and nozzle 94 for introducing gaseous hydrogen or other reactant gas into the exhaust stream near the inlet of the gas flow enhancer device. The hydrogen or other gas can be produced by various types of gas generators (not shown) that are commercially available. For example, hydrogen can be produced using an electrolysis unit (not shown) that produces gaseous hydrogen from water. A pump (not shown) can be provided to pump the reactant gas from the electrolysis unit through the injection tube and nozzle.

The gas mixes with the flowing exhaust gases as it passes through the helical vanes and other structure in the gas flow enhancer unit 10b, in the manner described above. As it flows, some of the hydrogen may react with various waste gasses, including pollutants, in the exhaust stream. This has the beneficial effect of reducing undesirable emissions from the engine. When the exhaust gas reaches the end of the gas flow enhancer unit, it is highly ionized and passes an electrode device, such as an anode/cathode pair 96, 98, which provide an electrical charge. This electrical charge causes the hydrogen remaining in the exhaust stream to combust and/or ionize, along with any other unburned species that may remain in the exhaust stream. This creates a plasma cloud 100 near the outlet end of the gas flow enhancer unit. This plasma cloud improves emissions by reforming the gas and/or consuming unburned fuel species, and also creates a low pressure condition that helps improve flow through the gas flow enhancer unit.

In an alternative embodiment of the EGTP muffler concept, shown in FIG. 13, the gas flow enhancer unit 10c includes an injection tube 92 and nozzle 94 for introducing gaseous hydrogen near the inlet of the gas flow enhancer device, similar to the placement in the embodiment of FIG. 12. However, in this embodiment the electrode device, the anode 96 and cathode 98, is also disposed near the inlet of the device, producing the plasma cloud 100 at the inlet. This embodiment works well in a turbo down pipe, as described in more detail below, where its effect is to spool up the turbo faster, so as to produce turbo boost at lower RPM levels. This is believed to increase performance and fuel efficiency, and decrease emissions. In this embodiment, the pressure and flow characteristics of the exhaust flow are improved (i.e. vacuum is created) at the inlet of the device, rather than near the outlet. The effect is to improve the pressure differential across the device, and increase the flow rate of gas through the device. Additionally, while the hydrogen will not have an opportunity to substantially mix with the exhaust gases before combustion, the combustion in a low pressure environment will still help consume unburned hydrocarbons and other pollutants that otherwise would be exhausted to the atmosphere.

Yet another alternative embodiment of a gas injection EGTP device 10d is shown in FIG. 14. This embodiment is like that of FIG. 13, except that the electrode device comprises a spark plug 102, instead of an anode/cathode pair. Like the anode cathode pair, the spark plug, firing at a frequency of about 15 kHz, has the effect of producing ionization/combustion of the gases near the inlet of the gas flow enhancer device. This embodiment also has the advantage that it uses common off-the-shelf parts (a conventional spark plug), rather than unusual or specialty parts.

It is to be understood that the elements of the various embodiments shown in FIGS. 12-14 can be put together in a variety of additional combinations that are not shown. For example, in the embodiment of FIG. 12 a spark plug, such as that shown in FIG. 14, can be provided at the outlet end of the device in place of the anode and cathode 96, 98. Other combinations are also possible.

Figure 5:
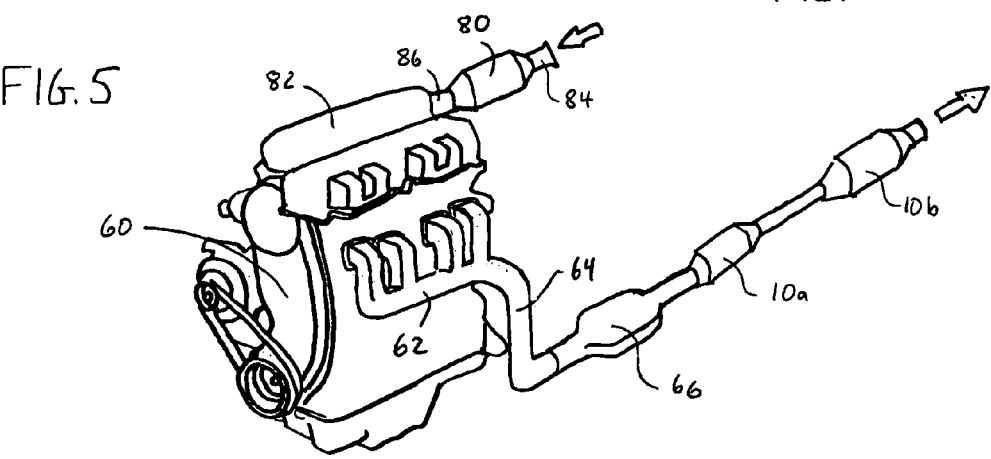
FIG. 5 is a perspective view of an engine having an exhaust system with two gas flow enhancers disposed therein, and a gas flow enhancer disposed in the engine air intake.

Multiple gas flow enhancers of different dimensions can be provided in a single exhaust system to provide their effects at different operating speeds. For example, shown in FIG. 5 is a four cylinder internal combustion engine 60 with an exhaust manifold 62 that converges into an exhaust pipe 64, leading to a catalytic converter 66. Following the catalytic converter, two gas flow enhancers 10a, 10b, configured as discussed above, are disposed in the exhaust pipe. The first gas flow enhancer 10a has a smaller diameter and is most effective at lower speeds, while the second larger diameter gas flow enhancer 10b is primarily effective at higher speeds.

In one operative example, the inventor tested a 1996 Mitsubishi 3000GT with a gasoline-powered turbocharged 3.0 liter V6 engine both before and after the installation of a dual in-line gas flow enhancer system in the vehicle exhaust system. This system included two gas flow enhancer devices installed in series on each side of the dual exhaust system of the vehicle. The gas flow enhancer disposed nearer the engine was a 3.5 inch diameter unit, and that toward the discharge end of the exhaust system was a 6.0 inch diameter unit. Before the installation, with a stock exhaust system, the dynamometer test showed the vehicle to have a peak power of 188.5 Hp at 4900 rpm, and peak torque of 223.3 ft-lb at 3700 rpm. After installation of the gas flow enhancer system, the same vehicle showed peak power of 255.2 Hp at 5100 rpm, and peak torque of 287.0 ft-lb at 3500 rpm.

In another operative example, the inventor tested a 2000 Ford F-250 pickup truck with a fuel-injected 7.3 liter V8 Deisel engine both before and after the installation of a single 6.0 inch diameter gas flow enhancer device at the discharge end of the vehicle exhaust system. Before the installation, with a stock exhaust system, the dynamometer test showed the vehicle to have a peak power of 258.9 Hp at 3000 rpm, and peak torque of 516.8 ft-lb at 2500 rpm. After installation of the gas flow enhancer device, the same vehicle showed peak power of 268.1 Hp at 2750 rpm, and peak torque of 522.3 ft-lb at 2500 rpm.

In yet another operative example, the inventor has installed a gas flow enhancer on a class 8 Volvo semi tractor having a Cummins ISX Deisel engine rated at 475 Hp. Prior to the installation, the truck had an average fuel economy of 6.47 mpg. After the installation, the same truck's average fuel economy over the ensuing fourteen months increased to 7.79 mpg, an increase of about 20%.

The various embodiments of the gas flow enhancer device shown in FIGS. 1-5 and 12-14 all provide a single set of inner and outer vanes and a single expansion chamber. Shown in FIG. 7 is an alternative embodiment of a gas flow enhancer 110 having a dual-chamber or dual-stage configuration. Like the above-described embodiments, this embodiment comprises a housing 112 with an inlet 118 for receiving flowing gas, and an outlet 120 for discharging the gas. The housing includes a diverging section 124, disposed adjacent the inlet, and a converging section 128 disposed adjacent the outlet.

Figure 8:
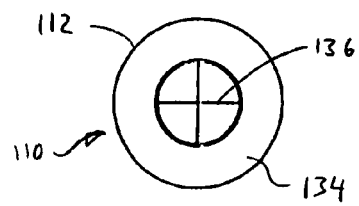
FIG. 8 is a transverse cross-sectional view of the gas flow enhancer of FIG. 6, showing the intermediate flow straightener.

Unlike the above-described arrangements, the flow enhancer 110 of FIG. 7 includes more than one set of vanes and splitter pipes for producing the helical or spiral flow. The device includes a first expansion chamber 122a, within which are a first set of inner vanes 114a and first set of outer vanes 116a, attached to a first inner cylinder 132a. The first set of vanes operate in the manner described above, producing inner and outer vortices which improve the flow of gas through the device. The first sets of vanes are followed by an intermediate converging section 134, which includes a flow straightener 136, like those described above. A cross-sectional view showing the intermediate converging section and flow straightener is provided in FIG. 8.

Beyond the outlet of the intermediate converging section 134, the housing opens again to a second expansion chamber 122b, in which is a second set of vanes, including a second set of inner vanes 114b and second set of outer vanes 116b, attached to a second inner cylinder 132b. The second set of vanes operate in the same manner as the first, though the flow parameters will be slightly different at the inlet of the second set than at the inlet of the first. The first and second sets of vanes are configured substantially the same, and their relative configurations can be varied in any of the ways discussed above. The configuration of FIG. 7 essentially represents two flow enhancers disposed in series, but contained within a single housing.

Figure 9:
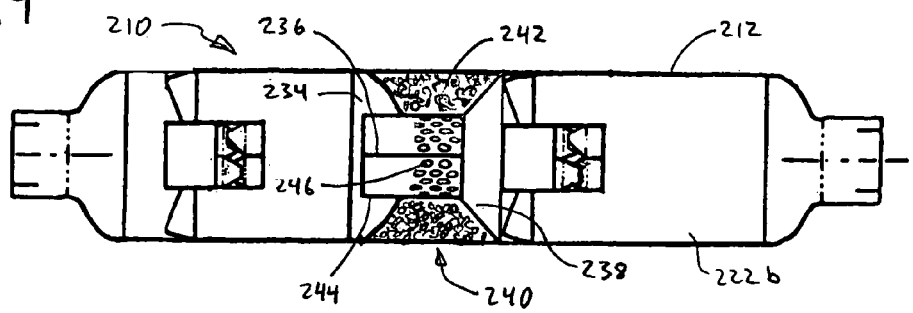
FIG. 9 is a side cross-sectional view of an alternative embodiment of a dual-stage gas flow enhancer having a perforated center flow straightener with sound-deadening packing material disposed therearound.

An alternative embodiment of a dual-stage gas flow enhancer device 210 similar to that of FIG. 7 is depicted in FIG. 9. In this embodiment, the intermediate converging section 234 and flow straightener 236 are followed by an intermediate diverging section 238 that allows the flow to gradually expand into the second expansion chamber 222b. This helps reduce turbulence in the flow as it expands a second time, and thus improves flow. The annular space 240 between the intermediate flow straightener and the outer wall of the housing 212 can be filled with packing material 242, such as is commonly used in automobile mufflers. The central flow straightener tube 244 can include a plurality of small openings 246 around its sides that allow communication between the annular chamber of packing material and the flow of gas. Because the annular chamber has no outlet, there will be no actual or net flow of gas thereinto. However, the openings allow some of the noise associated with the flowing gas to be dampened by the packing material, perhaps by as much as 10 dB.

Figure 15:
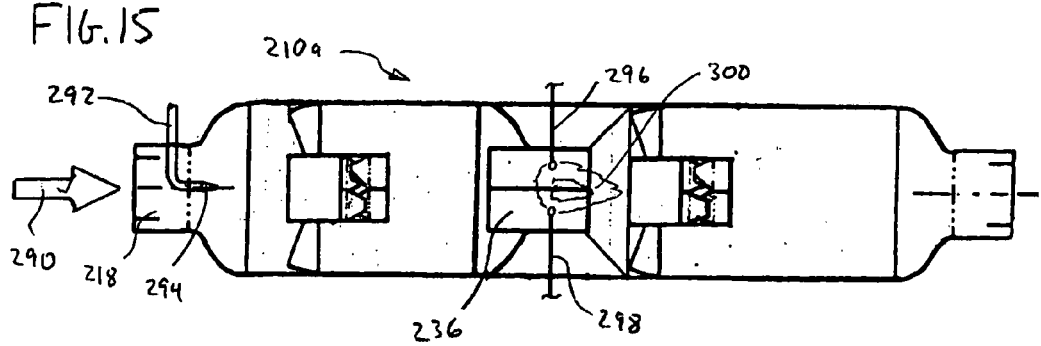
FIG. 15 is a side cross-sectional view of another alternative embodiment of a dual-stage gas flow enhancer having gas injection and charged electrodes disposed in the vicinity of the center flow straightener.
Figure 16:
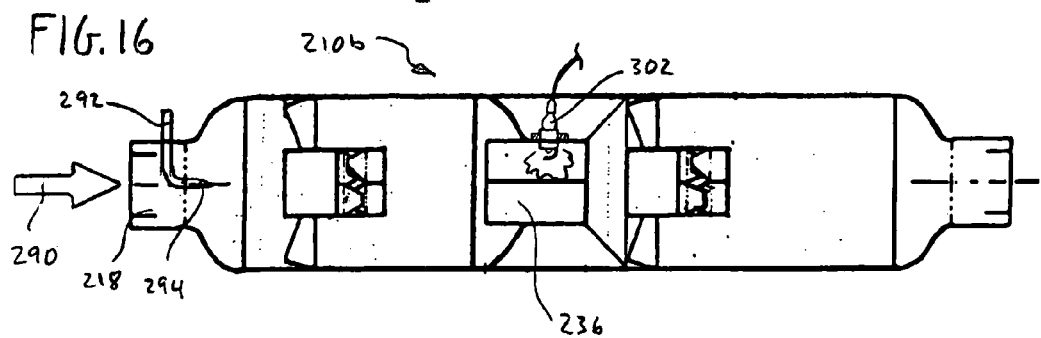
FIG. 16 is a side cross-sectional view of yet another alternative embodiment of a dual-stage gas flow enhancer having gas injection and a spark plug disposed in the vicinity of the center flow straightener.

Other alternative dual-stage gas flow enhancer configurations are shown in FIGS. 15 and 16. In these embodiments, the inlet 218 includes a gas injection tube 292 and nozzle 294 for injection of a reactant gas, as discussed above. Then, an electrode device is disposed within the central flow-straightener 236. In the embodiment of FIG. 15, the electrode device comprises an anode 296 and cathode 298, which are electrically charged and have the effect of producing a plasma cloud 300 near the inlet region of the second expansion chamber. In the embodiment of FIG. 16, the electrode device comprises a spark plug 302 disposed in the central flow straightener 236. These configurations provide the advantages discussed above with respect to gas injection and ignition/ionization of the mixed gas stream, but do it in the dual-stage gas flow enhancer unit.

A gas flow enhancer according to the present invention can also be used in gas flow conduits other than exhaust conduits. For example, as shown in FIG. 5, an inlet gas flow enhancer 80 can be disposed in an engine air intake 82. In such an installation, the inlet 84 to the gas flow enhancer is open to the atmosphere, and the outlet 86 is attached to the engine intake. Because the device reduces pressure at its outlet, it provides more efficient flow of gas (i.e. air) into the engine 60, and hence reduces the vacuum pressure needed for intake air. It also provides a smooth, efficient laminar flow of air with lower pressure and higher velocity at the center of the flow, which also reduces the temperature of intake air.

Figure 6:
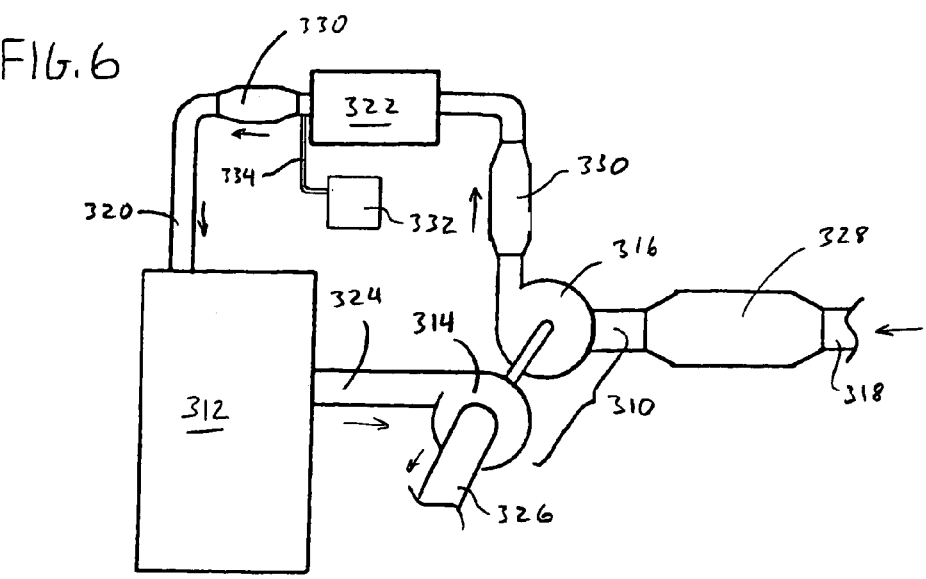
FIG. 6 is a semi-schematic view of an engine turbocharger system including multiple gas flow enhancers in various positions.

One or more gas flow enhancers as described herein can also be used in connection with a turbocharger, to increase turbocharger boost, and to allow higher boost without actuating the turbocharger wastegate. Such a configuration is shown in FIG. 6. As is well known, the turbocharger 310 uses the flow of exhaust gasses from the engine 312 to spin a turbine 314, which in turn powers an air pump or compressor 316. The air pump is typically located between the engine air intake 318 and the intake manifold 320 of the engine, and pressurizes the air going into the cylinders. This increases the quantity of air available for combustion, which increases the power output of the engine. To further improve boost, a turbocharger system may include an intercooler 322, which cools the intake air after compression by the air pump and before introduction into the engine. This increases engine power because cooler air is more dense.

The turbocharger 310 is attached to the exhaust manifold 324 of the engine 312. The exhaust from the cylinders passes through the turbine 314, causing the turbine to spin. After passing through the turbine blades, the exhaust gasses are expelled through the turbo down pipe 326, which leads to the engine exhaust system (not shown). The turbocharger may also include a wastegate (not shown), which is an internal valve that allows the exhaust to bypass the turbine and directly enter the engine exhaust system if boost pressure gets too high.

The gas flow enhancer of the present invention can be used in many ways in connection with a turbocharger to improve performance. As discussed above, one or more gas flow enhancers can be associated with the engine exhaust system (downstream of the turbo down pipe 326). These will help improve the flow of exhaust gasses through the turbine portion of the turbocharger. Additionally, a gas flow enhancer 328 disposed in the air intake 318 will help improve the flow of air into the compressor portion 316 of the turbocharger 310.

Additionally, one or more gas flow enhancers 330 can be provided in the air line 332 before and/or after the intercooler 322. While the intercooler improves turbo boost by cooling the intake air, some of its benefit is reduced by the mere fact that the intercooler itself interposes an obstruction in the air flow passageway. The provision of one or more gas flow enhancers before and/or after the intercooler help to compensate for the flow hindrance and pressure drop that the intercooler introduces. This helps improve the efficiency of the intercooler.

It is also believed that a gas flow enhancer (not shown) according to this invention could be disposed between the exhaust manifold 324 and the inlet of the gas turbine 314 to improve the flow of gasses into the turbocharger. However, it is expected that such a configuration, while possible, is likely to be impractical in many situations. Nevertheless, the provision of any or all of the gas flow enhancers shown in FIG. 6 can help to reduce back pressure and increase turbocharger performance. These devices provide a negative pressure that allows more rapid spool-up of the turbocharger 310 at lower RPM, thus reducing turbocharger lag and increasing engine performance and efficiency.

Figure 11:
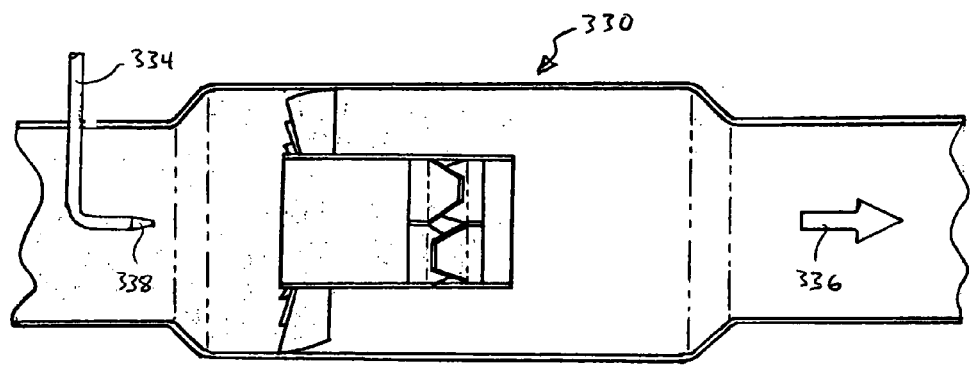
FIG. 11 is a side, cross-sectional view of an alternative gas flow enhancer configured for injecting gasses into an engine air intake system.

An additional alternative feature of the turbocharger related systems is also shown in FIGS. 6 and 11. The inventor has found that injection or production of certain reactant gases in the engine intake can improve performance. Such gases include ozone and hydrogen. As shown in FIG. 6, the intake system can include a gas generator 332, for generating the reactant gas, and an injector tube 334 for introducing the gas into the gas flow enhancer 330 that is just downstream of the intercooler 322. In the view of FIG. 11, this gas flow enhancer unit is shown in the opposite orientation as shown in FIG. 9, with air flow (indicated by arrow 336) moving from left to right.

The gas generator 332 can include a pump for pumping the gas through the injector tube 334, for injection through an injector nozzle 338 into the intake end of the gas flow enhancer unit. The gas generator can take many forms. In one embodiment, the gas generator can be an ozone generator that uses a high voltage, low current Tesla coil to produce ozone using an electric arc. Ozone generation devices are well known and are widely available. The mixture of ozone into the intake air increases the oxygen content of the air, and thus improves combustion. Alternatively, the gas generator can be a hydrogen generator, such as an electrolysis unit that produces gaseous hydrogen from water, as described above. The injection of hydrogen into the intake air can boost combustion by providing additional fuel. Additionally, the boost it provides will not produce more pollution, given that the only chemical product of hydrogen combustion is water.

In one operative example, the inventor has installed a hydrogen injection system in a gas flow enhancer unit just downstream of the intercooler in a Volvo Detroit Series 500 Hp Deisel engine. This vehicle went from an average fuel economy of 6.4 mpg before the installation, to an average of 8.8 mpg after.

Other alternative configurations for the gas flow enhancer 330 of FIG. 11 can also be provided. For example, instead of the gas injection tube 334, the inlet region of the device can be provided with an anode/cathode pair (like the anode 96 and cathode 98 in FIG. 13) or a spark plug (like the spark plug 102 in FIG. 14) which create an electric arc to produce ozone directly in the inlet gas stream itself, rather than having the ozone produced elsewhere and pumped in. This configuration provides the advantages of introducing ozone into the system, but is simpler in configuration.

While the advantages to gas flow have been mentioned above, the gas flow enhancer also provides other benefits. First, in an exhaust system it reduces noise, like a muffler, but without using baffles, packing, and other back pressure-inducing structure common to conventional mufflers. The inventor has found that a vehicle provided with a gas flow enhancer as described above has no need for a conventional muffler in order to comply with generally accepted vehicle noise standards. The noise reduction is believed to be caused in part by the interruption in flow that the device provides. Specifically, noise from an internal combustion engine is produced by sharp flow pulses from the explosions in each cylinder. However, by producing the separated vortices, the gas flow enhancer disrupts the pulsatile flow, and thus disrupts the noise that the pulses would transmit. The device has been found to effectively lower the frequency of engine noise, and thus effectively reduce the amount of audible engine noise. Additionally, where overlapping outer vanes are provided, as depicted in FIG. 2B, the noise reduction is even greater.

The inventor has also found that the gas flow enhancer reduces engine operating temperature. This is believed to be the result of reducing exhaust back pressure, which causes the combustion to be more complete, thus producing less thermal energy and more kinetic energy. This reduced operating temperature naturally increases the life and effectiveness of lubricants and engine components, resulting in longer life of the engine.

The invention as disclosed herein thus provides an engine breathing and cooling apparatus that reduces outflow pressure of gasses in a conduit. It can be used to encourage exhaust flow away from an engine, or to encourage inflow of intake air into an engine, or in other areas where gas flow is present. It is believed that the device can be used with any internal combustion engine, and promotes more complete combustion, increases the efficiency and horsepower of the engine, lowers exhaust gas temperature, increases fuel economy, reduces emissions, increases lubricant and engine life, lowers soot output, and encourages the removal of carbon deposits from the engine. The device also functions as a muffler by naturally lowering the frequency of exhaust noise, thus effectively reducing the level of audible engine noise.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A gas flow enhancer for a combustion engine, comprising:
   a) a housing, enclosing an expansion chamber, having an inlet configured to receive an inlet flow of gas from a gas flow conduit at an inlet pressure;
   b) a plurality of outer vanes, disposed within the expansion chamber around an outer periphery thereof, configured to produce an outer helical flow of the pressurized gas;
   c) a plurality of inner vanes, disposed within the expansion chamber in a central portion thereof, configured to produce an inner helical flow of the gas within the central portion, the inner helical flow having a higher velocity and lower pressure than the outer helical flow;
   d) a flow separator, disposed in the central portion between the inner vanes and the outer vanes, configured to separate the gas flow into outer flow that flows past the outer vanes, and inner flow that flows past the inner vanes;
   e) an outlet, configured to combine the outer helical flow and the inner helical flow, so as to produce an outlet laminar flow profile having a lower average pressure than the inlet pressure and
   f) a gas flow enhancer including a flow straightener, disposed within the outlet, configured to diminish the helical flow of the gas.

2. A gas flow enhancer in accordance with claim 1, wherein the gas flow conduit comprises an air intake conduit of the combustion engine.

3. A gas flow enhancer in accordance with claim 1, wherein the inner vanes are disposed at an angle of from about 30 degrees to about 55 degrees relative to the direction of inlet gas flow, and the outer vanes are disposed at an angle of from about 15 degrees to about 55 degrees relative to the direction of inlet gas flow.

4. A gas flow enhancer in accordance with claim 1, wherein the outer vanes are disposed at a location within the expansion chamber that is about one fifth the distance between the inlet and outlet.

5. A gas flow enhancer in accordance with claim 1, wherein the inner vanes and outer vanes are substantially planar.

6. A gas flow enhancer in accordance with claim 1, wherein the outlet laminar flow profile comprises lower pressure and higher velocity in a central region of a cross-section of the outlet than toward a periphery thereof.

7. A gas flow enhancer in accordance with claim 1, wherein the expansion chamber further comprises a diverging section, disposed adjacent the inlet, a converging section, disposed adjacent the outlet, and a substantially cylindrical section between the diverging and converging sections, the converging and diverging sections providing a transition between a smaller diameter of the gas flow conduit and a larger diameter of the cylindrical section.

8. A gas flow enhancer in accordance with claim 1, wherein the gas flow conduit comprises an exhaust conduit of the combustion engine.

9. A gas flow enhancer in accordance with claim 8, wherein the gas flow enhancer is configured for attachment to the exhaust conduit in place of a muffler.

10. A gas flow enhancer in accordance with claim 1, wherein the gas flow conduit is associated with a turbocharger system of the combustion engine.

11. A gas flow enhancer in accordance with claim 10, wherein the gas flow conduit is associated with an intercooler of the turbocharger system.

12. A gas flow enhancer in accordance with claim 1, wherein the flow separator comprises an inner cylinder, disposed within the expansion chamber, the inner vanes being contained within the inner cylinder.

13. A gas flow enhancer in accordance with claim 12, wherein the inner vanes are disposed adjacent to a rearward edge of the inner cylinder, and the outer vanes are disposed toward a leading edge of the inner cylinder.

14. A gas flow enhancer in accordance with claim 1, further comprising:
   a) a second expansion chamber, disposed within the housing following the aforesaid expansion chamber;
   b) a second plurality of outer vanes, disposed within the second expansion chamber around an outer periphery thereof, configured to produce a second outer helical flow of the pressurized gas;
   c) a plurality of inner vanes, disposed within the second expansion chamber in a central portion thereof, configured to produce a second inner helical flow of the gas within the central portion, the second inner helical flow having a higher velocity and lower pressure than the second outer helical flow;
   d) a second flow separator, disposed between the second inner vanes and the second outer vanes, configured to separate the gas flow into a second outer flow that flows past the outer vanes, and a second inner flow that flows past the inner vanes; and
   e) a second outlet, configured to combine the second outer helical flow and the second inner helical flow, so as to produce a second outlet laminar flow profile having a lower average pressure than the inlet pressure; and
   f) an injection nozzle, disposed near the inlet, configured to introduce a reactant gas into the inlet flow; and
   g) an electrode device, disposed downstream of the injection nozzle, configured to expose the reactant gas and the gas stream to an electric current wherein the electrode device is disposed near the outlet.

15. A gas flow enhancer in accordance with claim 14, wherein the reactant gas is selected from the group consisting of ozone and hydrogen.

16. A gas flow enhancer in accordance with claim 14, wherein the electrode device is selected from the group consisting of a spark plug and an anode/cathode pair.

17. An exhaust system for a combustion engine, comprising a first gas flow enhancer of claim 1 oriented in an exhaust pipe, connected to the engine.

18. An exhaust system in accordance with claim 17, further comprising a second flow enhancer disposed in the exhaust pipe, the second gas flow enhancer including:
   a) a second expansion chamber, disposed within the housing following the aforesaid expansion chamber;
   b) a second plurality of outer vanes, disposed within the second expansion chamber around an outer periphery thereof, configured to produce a second outer helical flow of the pressurized gas;
   c) a plurality of inner vanes, disposed within the second expansion chamber in a central portion thereof, configured to produce a second inner helical flow of the gas within the central portion, the second inner helical flow having a higher velocity and lower pressure than the second outer helical flow;

d) a second flow separator, disposed between the second inner vanes and the second outer vanes, configured to separate the gas flow into a second flow that flows past the outer vanes, and a second inner flow that flows past the inner vanes; and e) a second outlet, configured to combine the second outer helical flow and the second inner helical flow, so as to produce a second outlet laminar flow profile having a lower average pressure than the inlet pressure.

19. An exhaust system in accordance with claim 18, wherein the second gas flow enhancer is disposed in the exhaust pipe at a position closer to the engine than the first gas flow enhancer.

20. An exhaust system in accordance with claim 18, wherein the second gas flow enhancer has a size that is smaller than a size of the first gas flow enhancer.

21. An exhaust system in accordance with claim 17, wherein the first gas flow enhancer is configured for attachment to the exhaust pipe in place of a muffler.

22. The exhaust system of claim 17 wherein the gas flow enhancer further comprises an injection nozzle, disposed near the inlet, configured to introduce a reactant gas into the inlet flow.

* * * * *